US005992099A

United States Patent [19]

Thomas

[11] Patent Number: 5,992,099

[45] Date of Patent: Nov. 30, 1999

[54] DEVICE FOR JOINING A WINDOW PANE TO A WINDOW LIFTER

[75] Inventor: Michael Thomas, Coburg, Germany

[73] Assignee: Brose Fahrzeugteile GmbH & Co., Germany

[21] Appl. No.: 08/894,535

[22] PCT Filed: Feb. 22, 1996

[86] PCT No.: PCT/DE96/00341

§ 371 Date: Nov. 4, 1997

§ 102(e) Date: Nov. 4, 1997

[87] PCT Pub. No.: WO96/26080

PCT Pub. Date: Aug. 29, 1996

[30] Foreign Application Priority Data

Feb. 23, 1995 [DE] Germany ........................ 295 03 036 U

[51] Int. Cl.[6] .......................... B60J 1/16

[52] U.S. Cl. .......................... 49/375

[58] Field of Search .......................... 49/374, 375, 502; 52/204.591, 204.62, 204.71, 208, 716

[56] References Cited

U.S. PATENT DOCUMENTS

| | | | |
|---|---|---|---|
| 4,825,594 | 5/1989 | Escaravage | 49/351 |
| 5,199,217 | 4/1993 | Roze | 49/375 |
| 5,546,704 | 8/1996 | Maruoka | 49/375 |
| 5,692,273 | 12/1997 | Rodde | 49/375 X |
| 5,765,310 | 6/1998 | Gold | 49/375 |
| 5,778,599 | 7/1998 | Saito | 49/375 |

FOREIGN PATENT DOCUMENTS

| | | | |
|---|---|---|---|
| 0208237 | 1/1987 | European Pat. Off. . | |
| 3108244 | 6/1982 | Germany . | |
| 4102941 | 8/1992 | Germany | 49/375 |
| 6135228 | 5/1994 | Japan . | |

*Primary Examiner*—Jerry Redman

*Attorney, Agent, or Firm*—Christie, Parker & Hale, LLP

[57] ABSTRACT

A snap-in device for connecting a window pane with a window regulator by using at least one pair of elastically expanding jaws wherein one of the jaws has at least one snap-in element in the form of a hook or pin pointing in the direction of the window pane and is associated with a hole in the pane. An insert guide device serves to expand the jaws when inserting the window pane into the snap-in device. In the engaged state of the window pane, the circumference of the snap-in element fills out the hole in the pane at least over a part of the width of the snap-in element.

23 Claims, 8 Drawing Sheets

DEVICE FOR JOINING A WINDOW PANE TO A WINDOW LIFTER

BACKGROUND OF THE INVENTION

The invention relates to a device for connecting a window pane to a window regulator.

European Patent No. 0 208 237 B1 describes a support element for connecting the window pane to a corresponding guide device which has several support wings to be mounted on either side of the lower edge of the window pane. One of the support wings supports a pin associated with a hole in the window pane. When the window pane is inserted between the elastic support wings, they bend outwards until the pin has locked in the hole in the pane.

In order to be able to insert the window pane between the two support wings, the top side of the pin is inclined to guide the bottom edge of the window pane past the pin during assembly. The drawback here however is the large amount of play associated therewith between the pin and the hole in the pane due to the reduced contact area between the pin and the hole on the circumference. Thus with a reversal of the stress direction, that is, the direction of movement of the window pane, often so-called reversal noises will occur. Furthermore, in the event of higher loads, particularly in the case of jammed window pane, the pin is likely to disengage from the hole in the pane whereby the window regulator becomes unusable.

A further snap-fitting coupling device between a window pane and window regulator is described in German Patent No. DE 31 08 244 A1. It consists of two interconnected channel-like profiled sections of which one encloses an area of the lower edge of the pane and is fixed thereto. The other downwardly open profiled section supports at its ends inwardly directed hooks which can engage projections of angled elements of the lift mechanism whereby a keyed connection is achieved. During assembly, the connecting elements are forced to snap together through the force of the window pane against the upper stop position whereby at the an automatic alignment of the pane in the frame structure takes place simultaneously, at which time additional manual adjustments are not required.

However, since the profile-like coupling element must be prefitted on the lower edge of the pane, the window assembly has a thick structure which makes insertion of the window pane in the door shaft difficult. Owing to the necessary lack of seals in this area, damage to the paintwork often occurs during assembly. A further problem can be produced by the close tolerances required in the snap-in area of the coupling elements in order to avoid reversal noises during operation of the window regulator.

Another type of snap-in pane fixing is described in Japanese Patent No. 6-135228. The elements fixed on the lower edge of the window pane have at their free ends conical barb-shaped elements each associated with a U-shaped connecting element of the window regulator. The U-shaped connecting elements also have inclined guide inserts with which the conical areas of the elements fixed on the window pane can engage. When bringing together the connecting elements the arms of the U-shaped connecting elements are elastically spread out. At the end of assembly (in the snapped-in position), inwardly directed hooks provided at the free ends of the U-shaped connecting elements engage over the projections of the conical barb-shaped elements. However, there is the disadvantage that the part of the connecting element fixed on the window pane and which angles away from the edge of the pane theoretically shortens the lift stroke.

The known snap-in connections between a window pane and the entrainment member of a window regulator use snap-in elements which engage in a hole in the pane and whose upper boundary faces are designed inclined as insert guides on the lower edge of the pane. As a result of this, a seating with a lot of play is automatically produced between the snap-in element engaged in the hole in the pane and the contour of the hole. This leads to reversal noises when changing the force direction engaging on the entrainment member. Furthermore, in the event of increased load conditions which arise when the window pane jams in the entrainment member, the large amount of play can lead to release of the connection.

SUMMARY OF THE INVENTION

According to one embodiment of the invention, a snap-in device for connecting a window pane with a window regulator is provided which includes at least one pair of elastically expanding jaws connected to the window regulator, wherein at least one of the jaws has at least one inwardly directed snap-in element in the form of a hook or pin or the like engages a hole in the pane in an engaged state and has a circumference which substantially fills the hole in the pane at least over a part of its width. An insert guide device is provided to spread out the jaws during insertion of the window pane in the snap-in device. The faces of the expanding jaws facing the window pane are convex and in their base area form an expansion area with a width greater than the thickness of the pane in which the free lower end of the window pane can swivel.

According to another embodiment of the invention, a device for connecting a window pane with a window regulator which is characterised by a structurally simplified design, easy to manufacture and simple to assemble is provided. The window pane requires no additional parts prior to its insertion in the door shaft, at least not those which lead to a significant increase in the thickness of the window pane. Furthermore an extensively play-free seating in the connecting device is ensured for the window pane in the entrainment member of the window regulator without impeding the production of the snap-in connection.

Another embodiment of the invention is based on the knowledge that the snap-in element of the entrainment member has to fill up as completely and as play-free as possible the associated pane hole in the assembled state in order to ensure a fixed keyed connection between the snap-in element and the hole in the pane and thus between the entrainment member and the window pane. However, the snap-in connection must be constructed so that this assembled state is separated from the assembly in which guide-in aids facilitate assembly and prevent damage to the parts to be fitted without the need for extra parts or assembly aids on the window pane.

According to another embodiment of the invention, both entrainment jaws are convex relative to the window pane and offer a widened or expanded area to house the lower edge of the pane in the lower base area. Thus the window pane can be moved a certain angle in the entrainment member and compensate for any manufacturing or assembly tolerances which may occur. This simultaneously prevents the jaws from expanding and the danger connected therewith of the connection being released between the window pane and entrainment member. The snap-in element is thereby preferably mounted in the area of the shortest distance between the opposing jaws rather than in the expanded area at the base.

In one embodiment, a chamfer is provided on the lower edge of the pane at least in the fixing area and, in conjunction with a comparatively short inclined insert cone on the end of the snap-in element, serves to expand the jaws of the entrainment member and thus guide in the window pane for the purpose of assembly. The incline directions of the chamfer of the lower pane edge and of the insert cone are complementary. Depending on the type of chamfer of the lower window pane edge, the insert cone of the snap-in element can be more or less narrow but is at most half as wide as the thickness of the window pane. The remaining area of the snap-in element substantially fills the hole in the pane so that no noticeable play can occur. So-called reversing noises are thereby avoided.

According to the invention, different embodiments of the chamfer of the lower pane edge can be used. Apart from the conventional wedge-shaped polishing of the glass edge there are further possibilities. For example a separate wedge element can be attached to the lower edge of the pane. When using a compound window pane of glass and plastic panes, a chamfer is preferably formed on the plastic pane and has a lateral wedged projection and preferably engages the entire width of the somewhat recessed glass pane. Even the recessed arrangement of the two window panes alone, that is, without a flat wedge shape, is suitable in compound structure to provide an edged contour according to the invention for facilitating the connecting process between window pane and entrainment member.

In a further embodiment, a further hole can be provided in the pane near the first hole which is allocated for a separate snap-in element. This second hole in the pane is located at a greater distance from the lower edge of the pane compared with the first hole. At the top free end of the jaw of the entrainment member which supports the snap-in element, the separate snap-in element, in the form of an expanding element, extends in the direction of the window pane and has an inclined insert guide dropping down in the assembly direction.

During the assembly process, first the lower edge of the pane enters into engagement with the inclined insert guide of the expanding element and presses the two jaws of the entrainment member apart. The necessary assembly gap is thus formed without having to act on the snap-in element in the normal way. As a result of this, it is not necessary to provide an inclined insert guide or similar element on the top side of the snap-in element. As a rule, a short conical end area is sufficient for problem-free insertion of the snap-in element in the associated hole in the pane when these come to align with each other. An extending base area of the snap-in element of this kind not only increases the load capacity of the connecting device, but also extensively fills out the hollow cavity of the hole in the pane whereby a lower amount of play occurs at the connection between the structural elements. The reversing noises which otherwise occur when changing over the load direction, for example, window raising and window lowering, can thus be extensively avoided.

When the lower edge of the window pane has reached the base of the entrainment member at the completion of the assembly process, the snap-in element and the expanding element snap into the associated holes in the pane.

In another embodiment, the jaws have on their facing sides a convex contour so that the gap extending between the jaws either side of the snap-in element widens conically. Through this design a restricted swivelling of the window pane is possible without causing tension in the pane which could damage the entrainment member or lead to a release of the connecting device.

BRIEF DESCRIPTION OF THE DRAWINGS

The invention will now be explained in further detail with reference to the embodiments shown in the drawings in which.

DETAILED DESCRIPTION

Figure 1A:
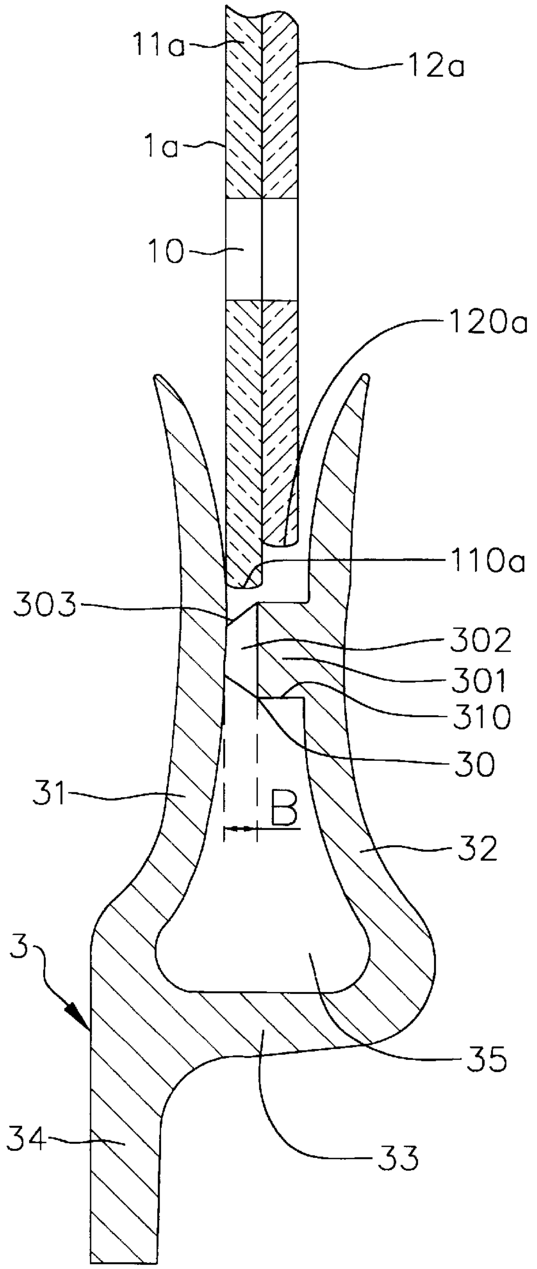
FIG. 1*a* shows a snap-in connecting device with a convex shaped clamping jaw as well as a compound window pane having a hole during the assembly, but prior to expanding the clamping jaws.

FIGS. 1*a* to 1*d* show various phases of the assembly process of a compound window pane 1*a* on an entrainment member 3 wherein the window pane has a hole 10. The compound window pane 1*a* consists of a glass pane 11*a* and a glass pane 12*a* which are attached to each other, and their lower edges 110*a,* 120*a* are offset relative to each other. A wedge shape ledge is thereby produced which is formed as a chamfer in the sense of the invention. The entrainment member 3 consists of two opposing jaws 31, 32 which are connected together by a common base 33 and can be fixed by a fixing plate 34 on a window regulator. One of the elastically expanding jaws 32 supports a pin or bolt-like snap-in element 30 which is associated with the hole 10 in the pane 1*a*. The snap-in element has a substantially cylindrical shape 301 having a free end adjoined by a guide-in cone 302 having an inclined sleeve face 303. The path of the incline of the sleeve face 303 corresponds to the inclined direction of the stepped, wedge-shaped off-set lower edges 110*a*, 120*a* of the pane, that is, the chamfer of the compound window pane 1*a*.

The illustrated embodiment of the entrainment member 3 represents a preferred embodiment of the invention with an expanded area 35 provided in the area of the base 33 of the jaws 31, 32 formed by the convex inner contour of the jaws 31, 32. The expanded area 35 ensures a tension-free seating of the pane in the entrainment member which will be explained in more detail further on.

FIG. 1*a* shows the compound window pane 1*a* immediately before its assembly on the entrainment member 3. The thickness of the individual panes 11*a*, 12*a* corresponds substantially to the width B of the guide-in cone 302. In order to ensure a secure assembly, the width B of the inclined sleeve face 303 of the guide-in cone 302 corresponds at least to the thickness of the pane lla which first contacts the sleeve face 303 during assembly. In the present example only the edges of the end faces 110*a*, 120*a* of the individual panes 11*a*, 12*a* are ground so that roughly the thickness of the pane 11*a* approximates the required width B of the guide-in cone.

Figure 1B:
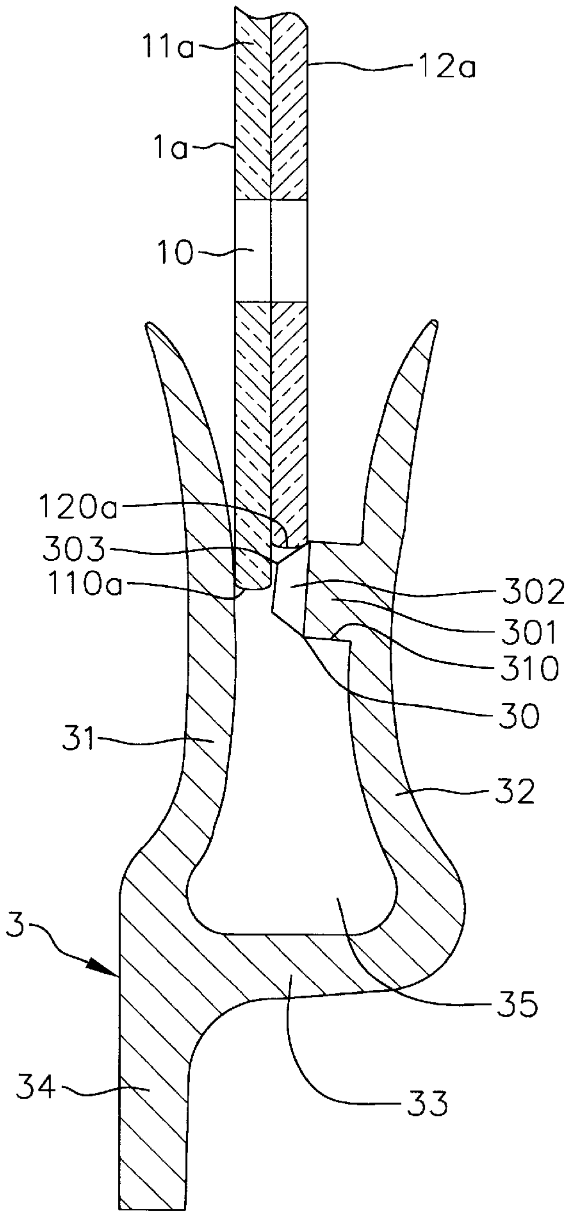
FIG. 1*b* shows the connecting device during the assembly, with a half-way expansion of the clamping jaws.
Figure 1C:
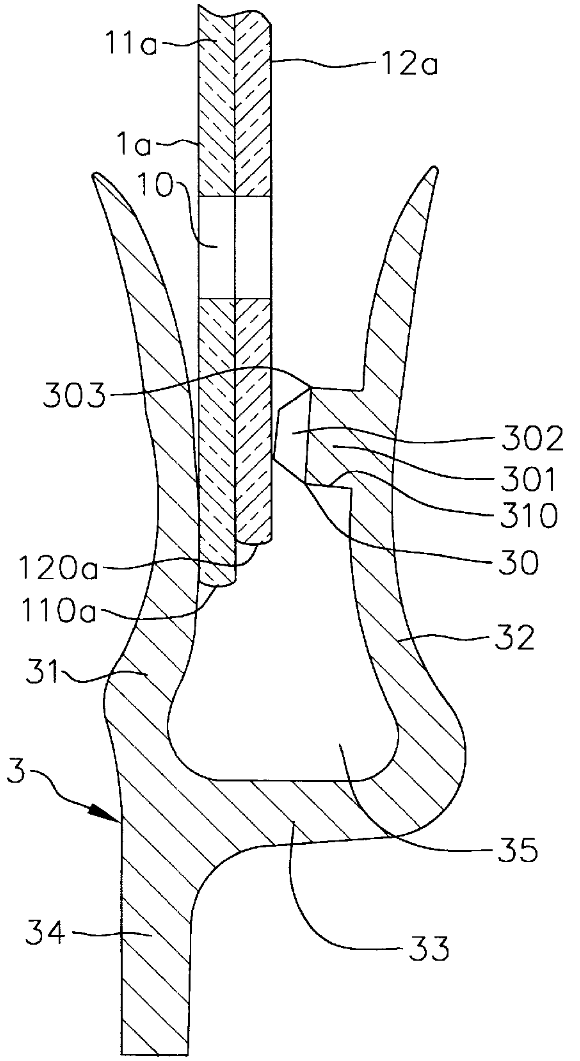
FIG. 1*c* shows the connecting device during assembly with a full expansion of the clamping jaws.
Figure 1D:
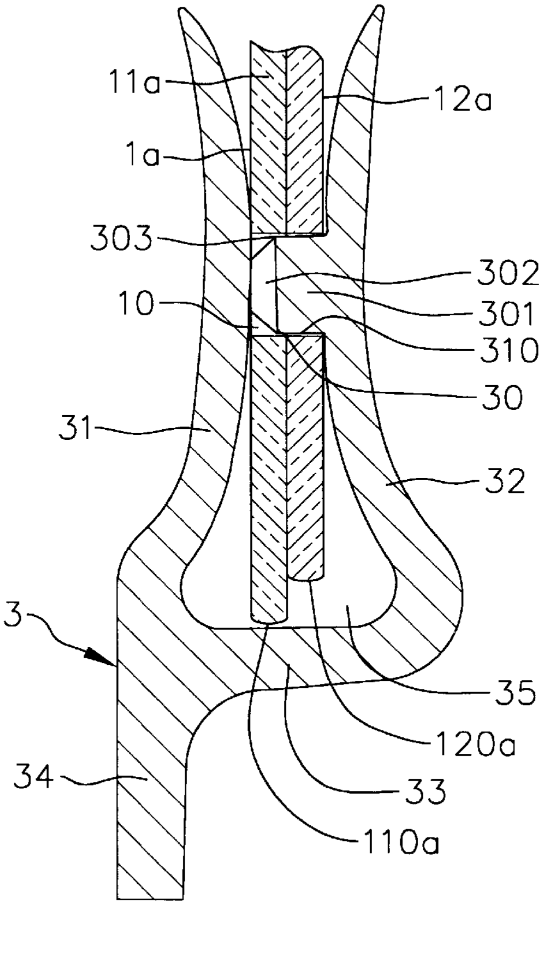
FIG. 1*d* shows the connecting device at the end of assembly.

FIG. 1*b* shows the entrainment member 3 in a half-expanded position wherein the pane 11*a* has been pushed between the left jaw 31 and the end face of the snap-in element 30 and the lower edge 120*a* of the adjoining pane 12*a* is in contact with the sleeve face 303 of the guide-in cone 302. With further penetration of the compound window pane 1*a* in the entrainment member 3, the jaws 31, 32 spread out to a maximum (FIG. 1*c*). The assembly process is completed by the snap-in element 30 engaging in the hole 10 in the pane. As shown in FIG. 1*d*, the lower edge 110*a* of the pane 11*a* thereby stands on the base 33 of the entrainment member 3.

Figure 2:
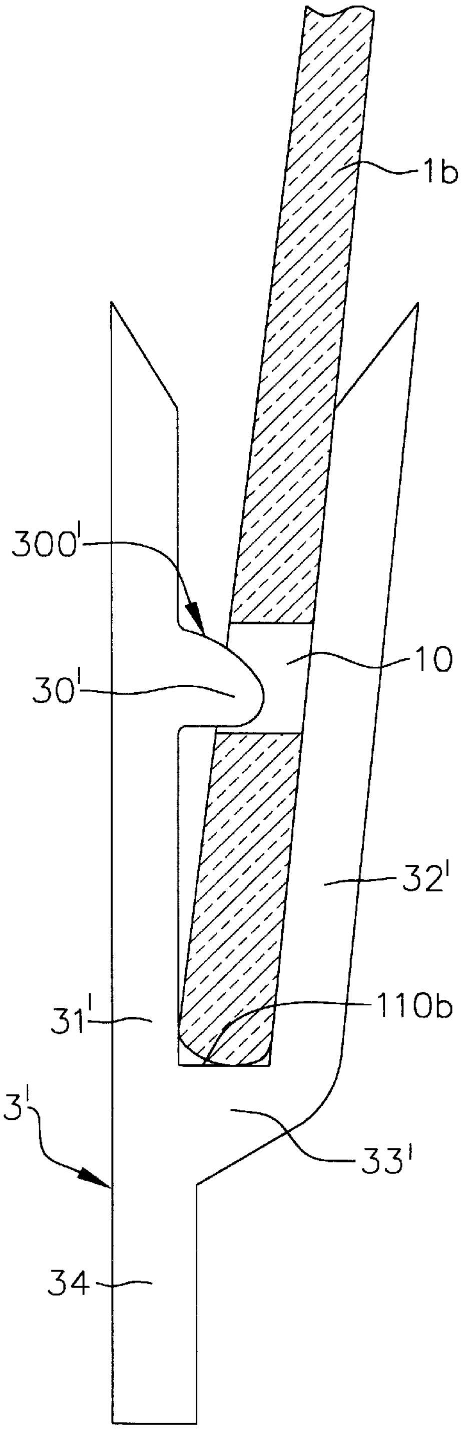
FIG.2 PRIOR ART
FIG. 2 shows a snap-in connecting device according to the prior art with a jammed window pane.

FIG. 2 shows a snap-in pane connection according to the prior art. It consists of two expanding jaws 31', 32' which are connected by a common base 33' and are connectable by means of a fixing plate 34' to a window regulator. The snap-in element 30' is molded in one piece on the jaw 31' and is associated with the hole 10' in the window pane 1*b*. The lower edge 110*b* of the pane is formed substantially flat and only its edges are ground.

The illustration of FIG. 2 shows a critical state of the connecting device with a jammed window pane 1*b* lying in the entrainment member 3'. Such a state can occur for example in the case of extreme load conditions (e.g., a jammed window pane). This not only leads to high tensions in the connecting device, which can also lead to breakages, particularly in very low temperatures, but also to at least a partial loss of the positive engagement between the hole 10' in the pane 1*b* and the snap-in element 30'. There is thus a greater danger of the connection between the pane 1*b* and entrainment member 3' becoming loose.

Figure 3:
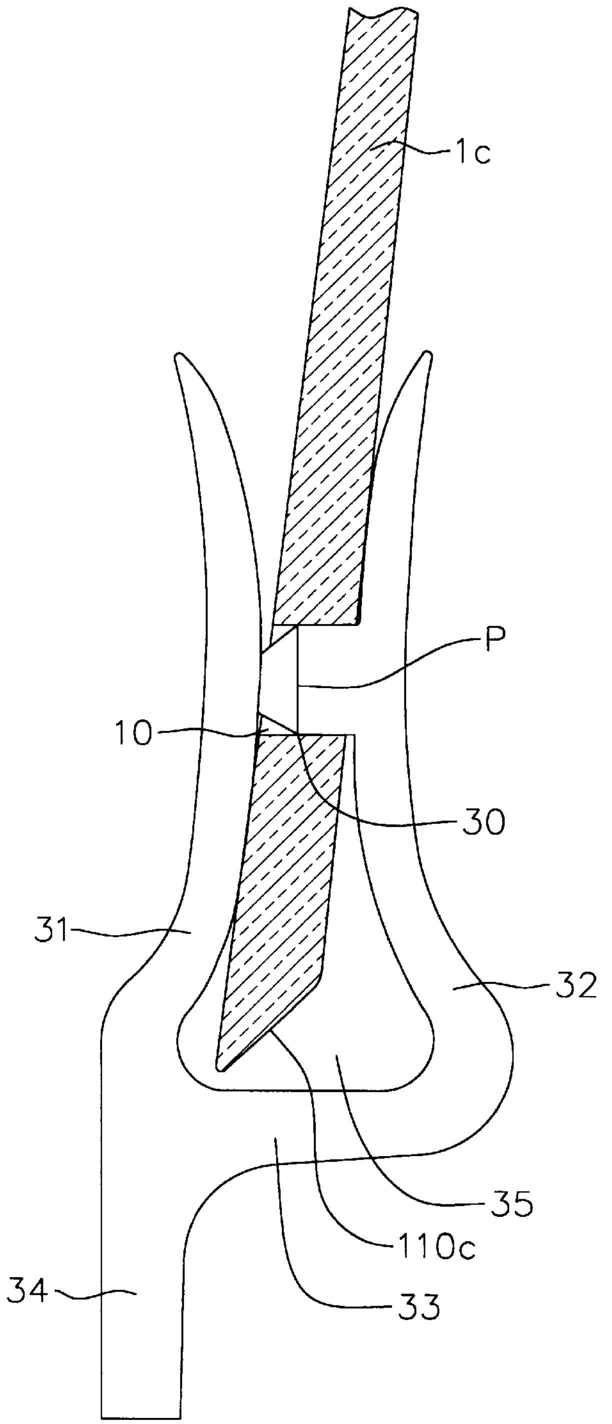
FIG. 3 shows an entrainment member according to FIG. 1*d*, but with jammed window pane and free play of the lower end of the window pane and a free play of the upper end of the window pane.

In another embodiment according to the invention, shown in FIG. 3, such negative tensions cannot occur. Since there exists a free expanded space both above and below the snap-in element 30, swivel movements of the window pane 1*c* about an apparent swivel point P in the area of the hole 10 may be carried out freely. Thus, there is no danger of the connection becoming loose.

Figure 4:
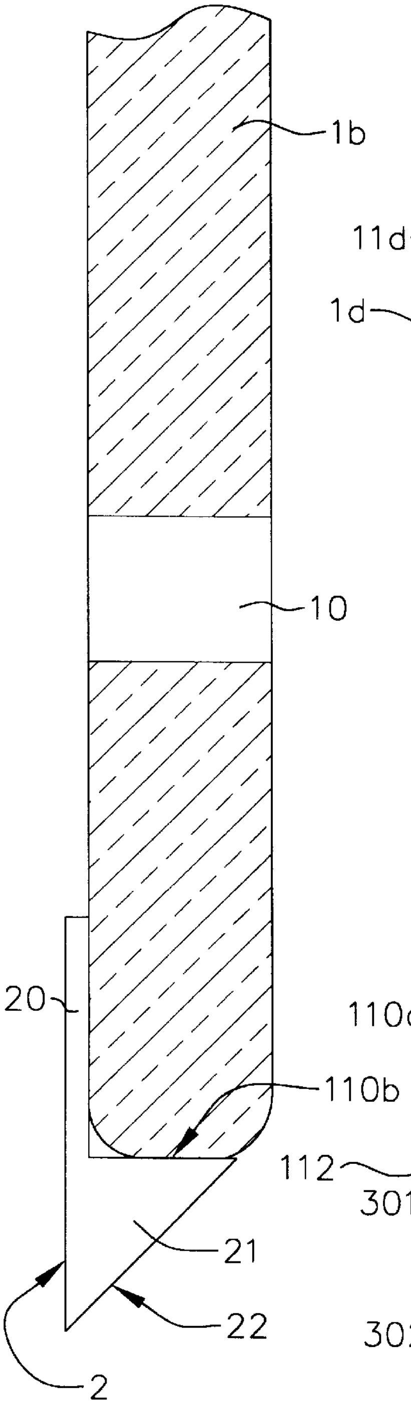
FIG. 4 shows a lower edge of a window pane and a connecting device with an attached wedge.

FIG. 4 shows the combination of a conventional window pane with a substantially planar lower pane edge with an assembly aid 2 placed thereon. It consists of a wedge 21 with a chamfer, inclined insert guide 22, and a side web 20 for accommodating an adhesive connection with the window pane 1*b*. This assembly aid 2 is preferably designed as a plastic part.

Figure 5:
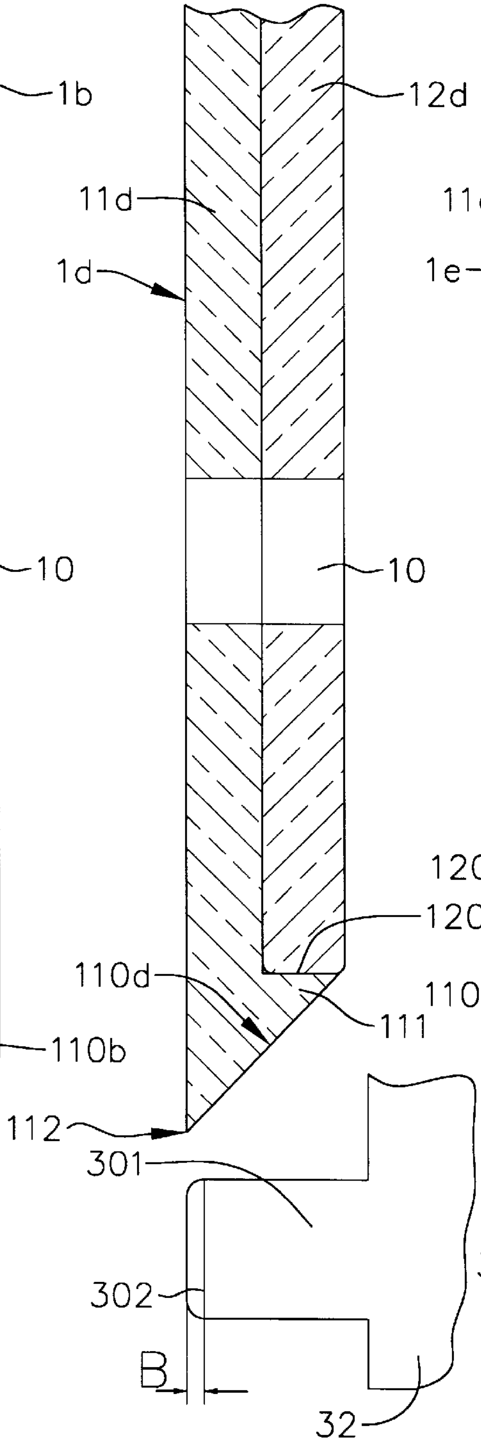
FIG. 5 shows a compound window pane of a glass and a plastic pane with an integrated wedge.

FIG. 5 shows a compound window pane 1*d*, consisting of a plastic window pane 11*d* and a glass window pane 12*d* wherein the plastics pane 11*d* projects with a wedged lower end 110*d* over a lower pane edge 120*d* of the glass pane 12*d*. The inclined lower edge 110*d* of the pane completely covers the lower edge 120*d* of the pane with a wedge shape projection 111. A wedge tip 112 has a very small diameter so that the width B of the insert guide cone can be made very short. The cylindrical area 301 of the snap-in element may then be made longer, thereby improving the bearing load of the connecting device.

Figure 6:
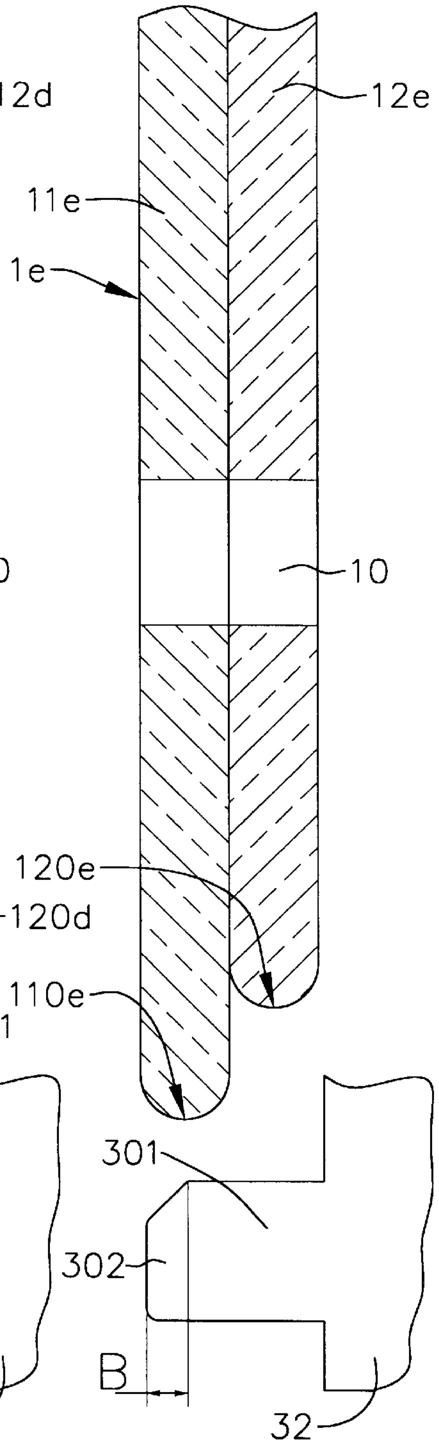
FIG. 6 shows a compound window pane of a glass and a plastic pane with recessed, chamfered lower pane edges.

According to another embodiment, a compound window pane 1*e* shown in FIG. 6 consists of two glass panes 11*e*, 12*e* attached to each other with their respective lower edges 110*e*, 120*e* arranged off-set relative to each other. These lower pane edges are strongly rounded and have substantially the contour of a semicircle. Width B of the guide-in cone 302 of the snap-in element 30 requires a minimum width which corresponds to only half the thickness of a pane 11*e*, 12*c*. Thus a problem-free insertion of the window pane 1*e* into the gap between the jaws 31, 32 of an entrainment member according to the invention is guaranteed.

FIGS. 7*a* to 7*d* show various phases of the assembly process of a window pane 1 on the entrainment member 3 of a window regulator. The entrainment member 3 consists of two opposing jaws 31, 32 which are connected by a common base 33 and are fixed by a fixing plate 34 on a window regulator (not shown). On one of the two jaws 32 is formed the snap-in element 30 and a wedge-shaped expanding element 4 which lies in an internal spacing A2 above the snap-in element 30. A separate hole 10, 13 in the window pane 1 is associated with each of these inwardly projecting parts 30, 4.

Figure 7A:
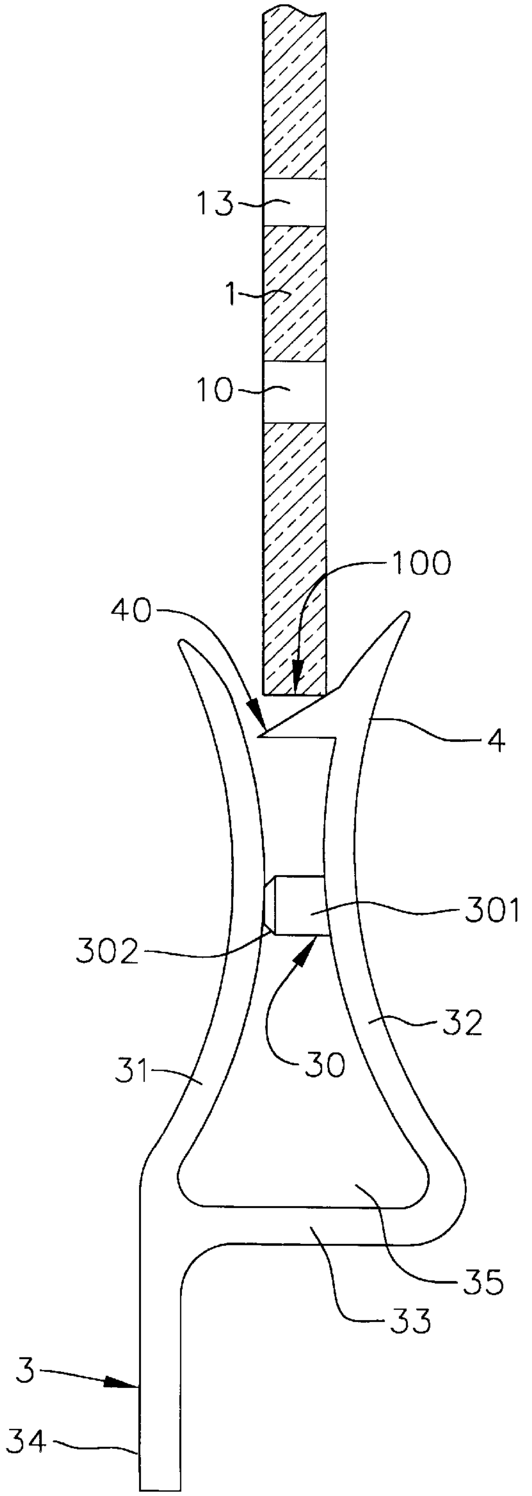
FIG. 7*a* shows another embodiment of the connecting device with an expanding element during assembly, but prior to expanding of the clamping jaws.
Figure 7B:
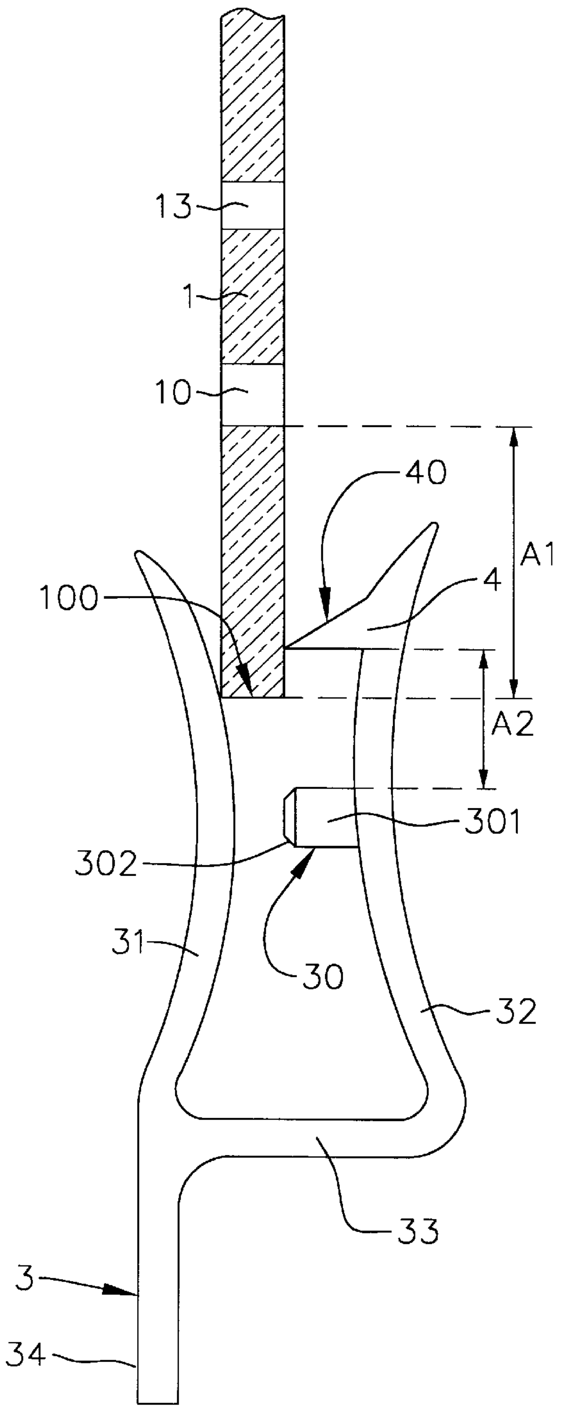
FIG. 7*b* shows the connecting device of FIG. 7*a* during assembly wherein the window pane engages the area of its lower edge with the expanding element.

FIG. 7*a* shows the first phase of the assembly process wherein the lower pane edge 100 contacts the inclined insert guide 40 of the expanding element 4. With further displacement of the window pane 1 in the direction of the entrainment member 3, the jaws 31, 32 spread out whereby at the same time the snap-in element 30 is lifted from the opposite jaw 31 and releases an insert gap (FIG. 7*b*).

Preferably, the length L of the expanding element 4 approximates the length of the snap-in element 30, or is even slightly longer. However, should the length L of the expanding element 4 be shorter than the length of the snap-in element 30, then a sufficiently large conical area 302 has to be selected so that the projecting lower pane edge 100 does not become blocked on the cylindrical area 301 of the snap-in element.

Figure 7C:
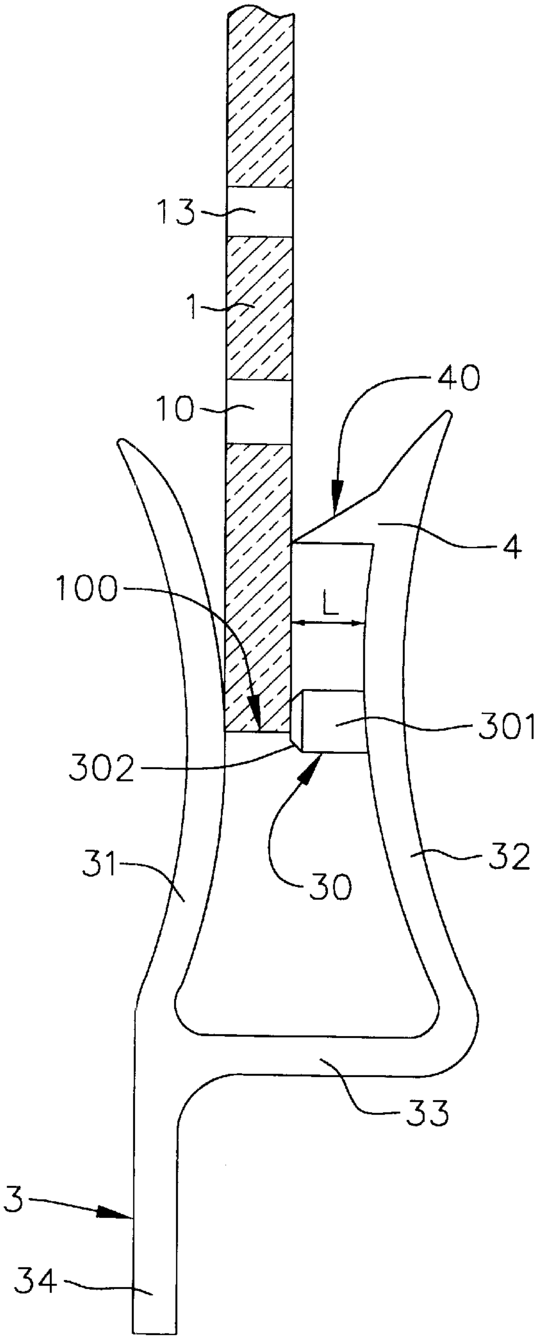
FIG. 7*c* shows the connecting device of FIG. 7*a* during assembly wherein the window pane is in engagement with the snap-in element in the area of its lower edge.

FIG. 7*c* shows an assembly phase wherein the lower pane edge 100 of the window pane 1 has already penetrated up to the end face of the snap-in element 30. To prevent the expanding element 4 from engaging hole 10 as it passes by the hole, the internal distance A2 between the expanding element 4 and the snap-in element 30 should be smaller than the distance A1 between the lower edge area of the hole 10 and the lower edge 100 of the pane. Otherwise a further penetration of the window pane 1 could be blocked by the snap-in element 30 as a result of the engaged expanding element 4. Alternatively, a comparatively large conical area 302 is provided on the snap-in element 30. In a further embodiment, the expanding element 4 and the snap-in element 30 are arranged laterally off-set from each other. Accordingly, the arrangement of the holes 10 and 13 in the pane must also be offset in an analogous arrangement.

Figure 7D:
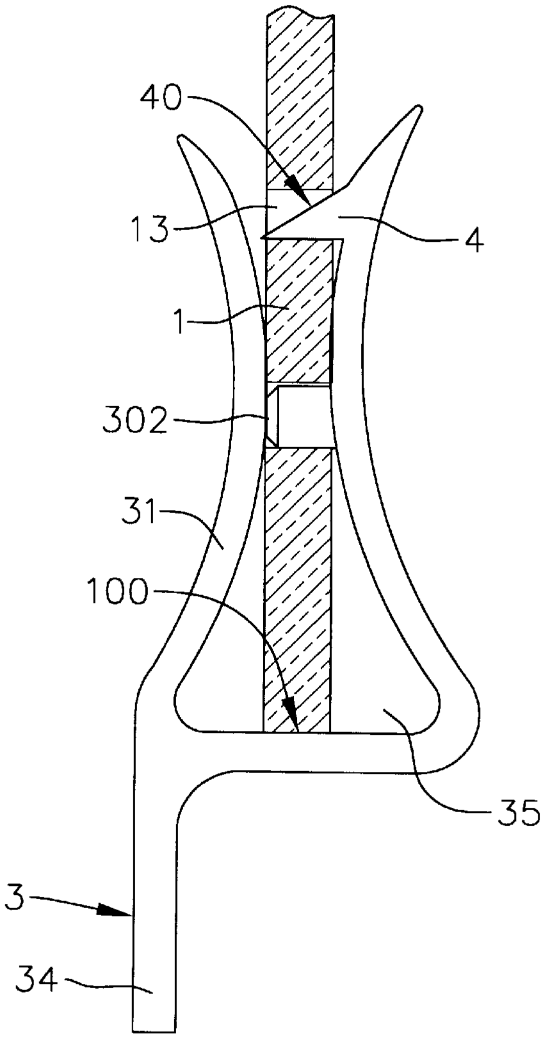
FIG. 7*d* shows the connecting device of FIG. 7*a* at the end of assembly.

FIG. 7*d* shows the connecting device at the end of the assembly process with the snap-in element 30 and expanding element 4 engaged in the respective associated hole 10, 13 of the pane.

Figure 8:
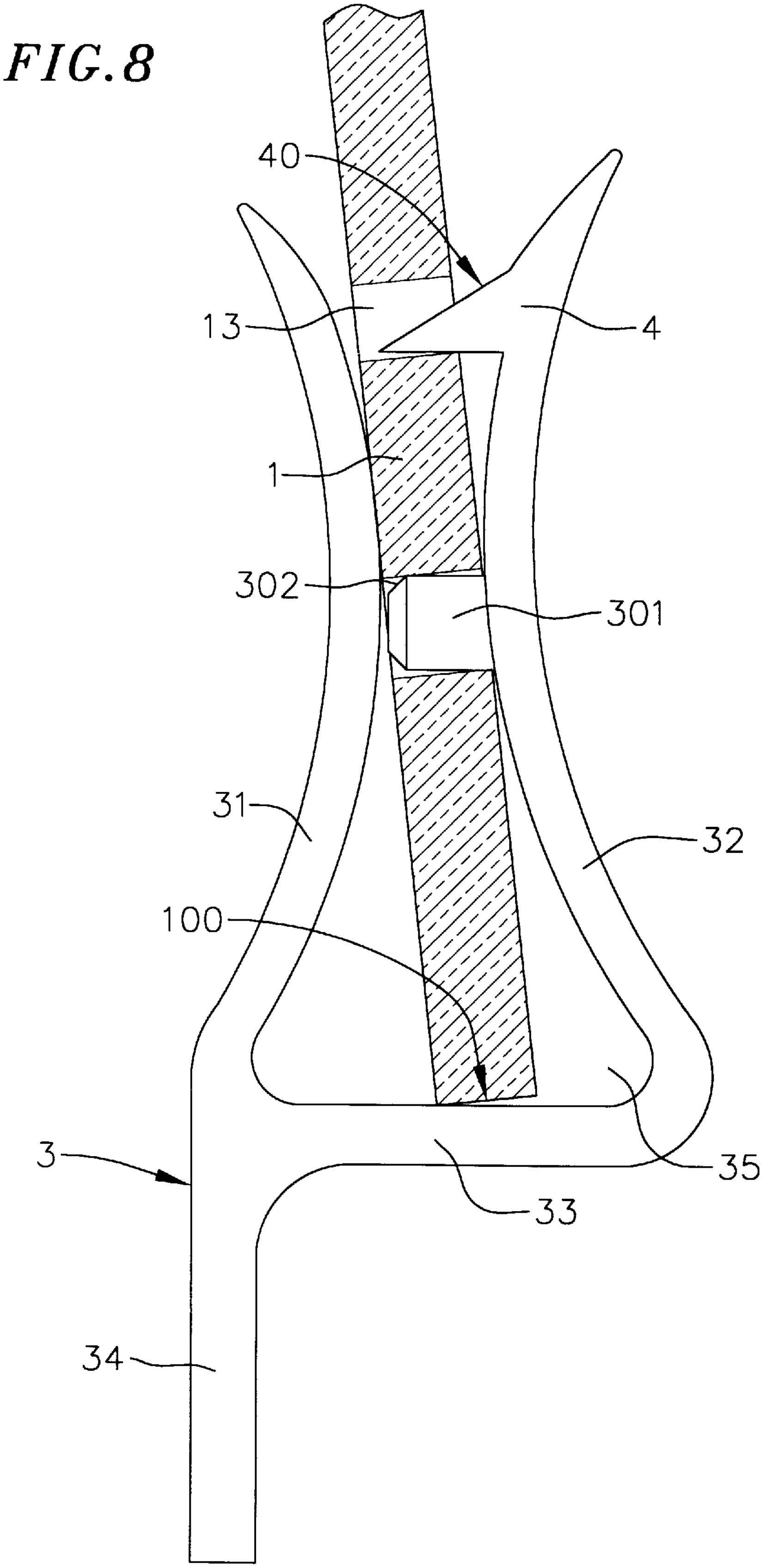
FIG. 8 shows the connecting device of FIG. 7*a* with a jammed window pane and free play of the lower end of the pane.

Another embodiment of the invention provides the use of convex expanding jaws 31, 32 wherein on either side of the snap-in element 30, an expanded area 35 is formed in the assembly direction for the window pane 1. In the event of the action of lateral forces on the window pane 1 (shown in FIG. 8) and which lead to tilting in the entrainment member 3, no tensions occur which could lead to breakage or release of the connecting device. The window pane 1 can swivel in the entrainment member 3 in a comparatively large angular area wherein the expansion area 35 is provided for the freedom of movement for the lower pane edge 100 in the area of the base 33 of the entrainment member 3.

Figure 9A:
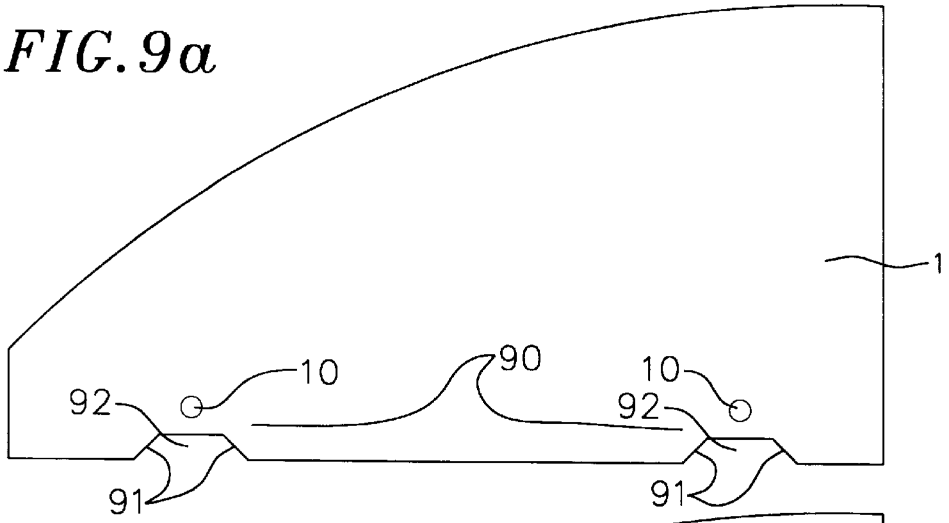
FIG. 9*a* shows a diagrammatic plan view of a window pane for use with a connecting device according to FIGS. 1*a* to 1*d*.
Figure 9B:
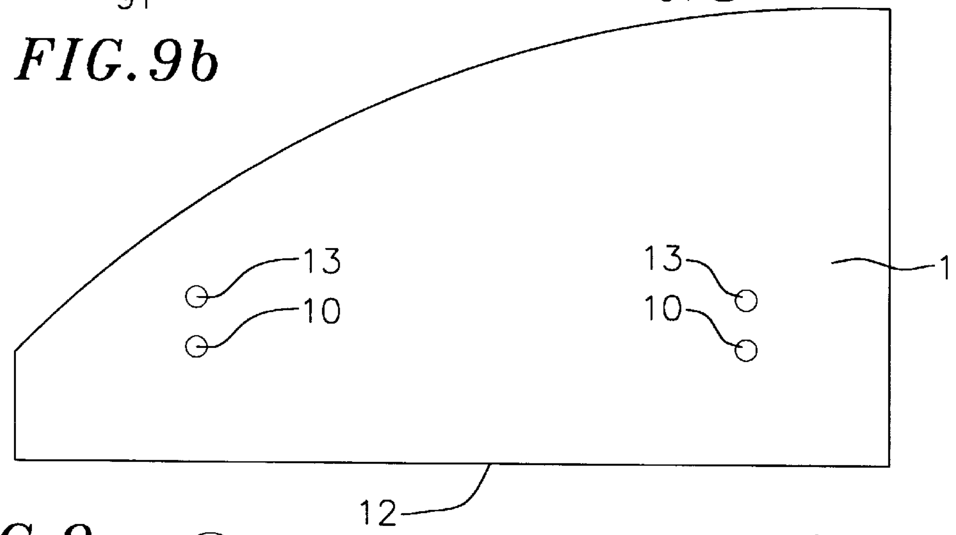
FIG. 9*b* shows a diagrammatic plan view of a window pane for use with a connecting device according to FIGS. 7*a* to 7*d.
Figure 9C:
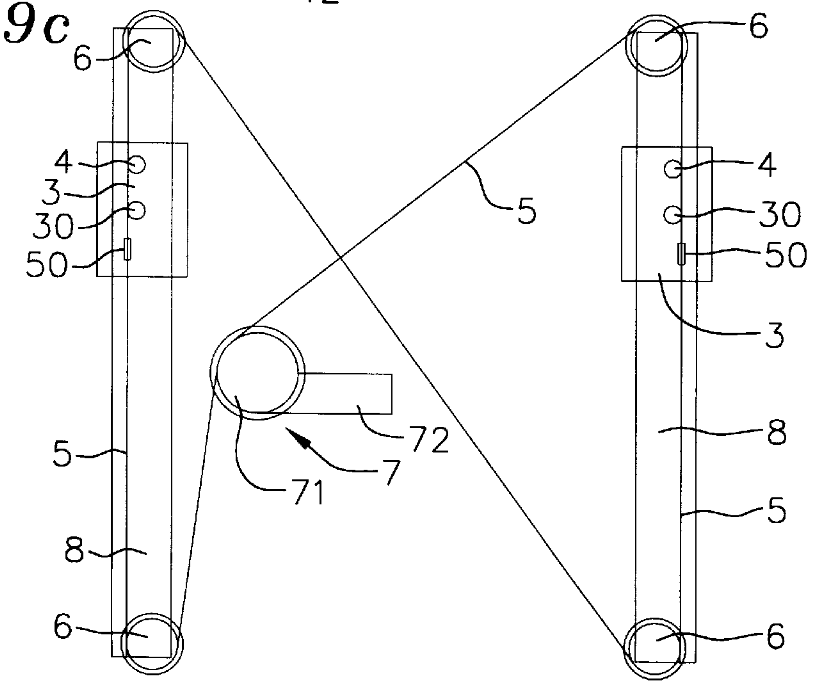
* and FIG. 9*c* shows a diagrammatic illustration of a double-strand cable window regulator for use with the various embodiments of the invention.

The connecting devices according to the invention can be used with particular advantage in cable window regulators as shown in FIGS. 9*a* to 9*c* through diagrammatic views of two window panes for use with a double-strand cable window regulator.

FIG. 9*a* shows a window pane 1 with recesses 92 provided in the fixing areas 90 wherein the recesses are defined by lateral conical guide faces 91 for engaging the entrainment member 3. The holes 10 in the pane contact the cylindrical area 301 of the pin or bolt like snap-in element 30 in the assembled state. This window pane is particularly suitable for the embodiment of the snap-in device shown in FIGS. 1*a* to 1*d*.

FIG. 9*b* shows a window pane 1 having fixing areas including holes 10 and 13 for holding the snap-in elements 30 and wedge shaped expanding element 4, respectively. This window pane is particularly suitable for the embodiment of the snap-in device shown in FIGS. 7*a* to 7*d*.

The window regulator shown in FIG. 9*c* consists of two parallel guide rails 8 on each of which an entrainment member 3 is displaceably mounted and is connected through nipples of the cable 5 in a nipple chambers 50 to a drive unit 7 consisting of a cable drum 71 and a motor 72. Cable rollers 6 serve to guide the cable 5 between the guide rails 8 and the drive unit 7.

I claim:

1. A window assembly for connecting with a window regulator comprising:

a window pane having a hole therethrough;

a snap-in device having at least one pair of elastically expanding jaws for connection with the window regulator, wherein at least one of the jaws has at least one snap-in element, wherein the snap-in element points in the direction of the window pane when the window pane is positioned between the at least one pair of jaws, corresponds with the hole in the window pane, and has a circumference which, in an engaged state of the window pane, fills out the hole in the window pane at least over a part of a width of the snap-in element; and an insert guide device for spreading out the at least one pair of jaws during insertion of the window pane therebetween;

wherein a face of each jaw of said at least one pair of jaws facing the window pane is convex shaped relative to the window pane; and wherein a base area of each such jaw forms an expansion area with a width greater than a thickness of the window pane in which a free lower end of the window pane can swivel.

2. The window assembly device according to claim 1 wherein the insert guide device for expanding the jaws comprises a part of the window pane.

3. The window assembly device according to claim 2 wherein the insert guide device further comprises a chamfer provided on the lower edge of the window pane and a guide-in cone on the snap-in element, wherein an incline direction of the chamfer coincides with an incline direction of the guide-in cone, and wherein a width of the guide-in cone is at least half as large as the thickness of the window pane.

4. The window assembly device according to claim 3 wherein an area adjoining the guide-in cone comprises a stop face running substantially orthogonally to the displacement direction of the window pane, and wherein the width of the guide-in cone substantially corresponds to a thickness of a first side of the window pane between a lower end of the chamfer complementary with the guide-in cone and a second side of the window pane which stops on the snap-in element.

5. The window assembly device according to claim 3 wherein the chamfer is formed on the lower window pane edge of two window panes.

6. The window assembly device according to claim 5 wherein each of the two connected window panes has a chamfer on a bottom edge thereof.

7. The window assembly device according to claim 3 further comprising an insert wedge stuck in a fastening area on a lower edge of the window pane.

8. The window assembly device according to claim 3 wherein the window pane comprises a glass pane and a plastic pane connected together and wherein a lower edge of the plastic pane projects over a lower edge of the glass pane and forms a common wedge-shaped closure.

9. The window assembly device according to claim 1 wherein the insert guide device comprises an expanding element connected to an upper free end of the at least one jaw of the at least one pair of jaws of an entrainment member of the device which supports the snap-in element and further comprising a second hole in the window pane into which the expanding element engages at the completion of the assembly process.

10. The window assembly device according to claim 9 wherein a length of the expanding element substantially corresponds to the thickness of the window pane and wherein the snap-in element supports a short guide-in cone, which extends at most over half the thickness of the window pane.

11. The window assembly device according to claim 9 wherein a length of the expanding element is greater than the thickness of the window pane and wherein the snap-in element supports at a free end a narrow insert chamfer which extends at most over a quarter of the pane thickness.

12. The window assembly device according to claim 9 wherein a distance of the first pane hole from the lower edge of the window pane is greater than an internal space between the snap-in element and the expanding element on the at least one of the jaws which supports the snap-in element.

13. The window assembly device according to claim 1 wherein a lower edge of the window pane has a plurality of recesses which are defined by side conical guide faces for accommodating an entrainment member.

14. The window assembly device according to claim 1 wherein the insert guide device comprises a conical end portion provided on the snap-in element.

15. The window assembly device of claim 1 wherein the insert guide device for expanding the jaws comprises a part of the snap-in device.

16. A snap-in device for connecting a window regulator to a window pane comprising:

a pair of elastically expanding jaws mountable to the window regulator, each of the jaws having an inside face, wherein the inside faces of the jaws have a convex shape and are positioned toward each other, and an expansion area formed from a base area of the pair of jaws, having a width between the inside faces of the jaws greater than a smallest distance between the inside faces of the jaws;

wherein the pair of jaws includes at least one snap-in element positioned between the jaws and which projects from one jaw toward the other and wherein the convex shape of the jaws extends below the snap-in element into the expansion area;

wherein the expansion area is capable of allowing a lower end of the window pane to swivel therein.

17. The device according to claim 16 further comprising an insert guide device capable of spreading out the jaws and guiding insertion of the window pane therebetween.

18. The device according to claim 17 wherein the insert guide device further comprises a guide-in cone on the snap-in element, the guide-in cone is capable of coinciding with a chamfer on the lower end of the window pane, and wherein a width of the guide-in cone is at least half the distance between the two jaws.

19. The device according to claim 17, wherein the insert guide device comprises an expanding element connected to an upper free end of at least one jaw of the pair of jaws, wherein the expanding element projects to the other jaw.

20. The device according to claim 19 wherein a length of the expanding element substantially corresponds to the distance between the two jaws at the upper free end and wherein the snap-in element includes a short guide-in cone which extends half the distance between the jaws at the most.

21. The device according to claim 19 wherein a length of the expanding element is greater than a length of the snap-in element.

22. The device according to claim 19 wherein a distance between the snap-in element and the expanding element along the jaw which supports the snap-in element is less than the distance between the base area of the jaws and the snap-in element.

23. The device according to claim 16 wherein the insert guide device comprises a conical end portion provided on the snap-in element.

* * * * *